Patented Sept. 30, 1924.

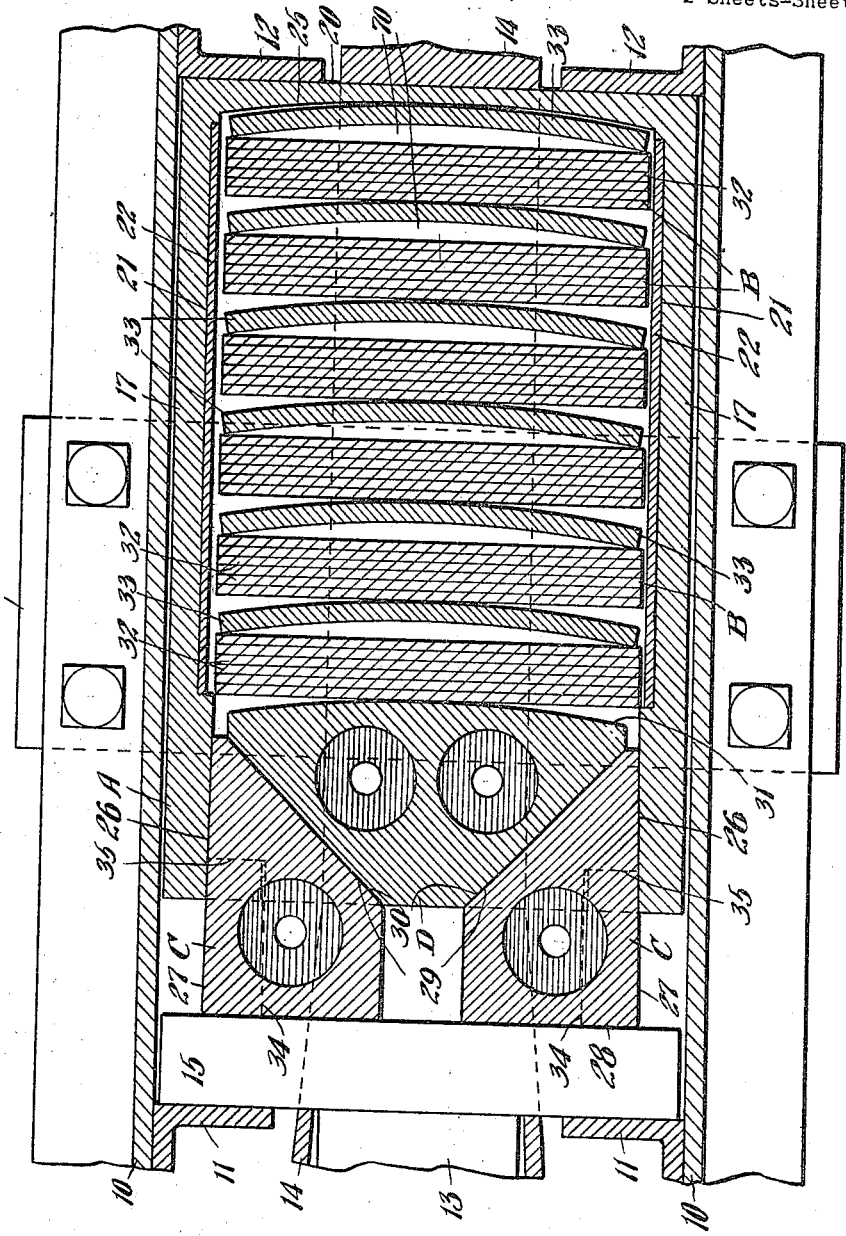

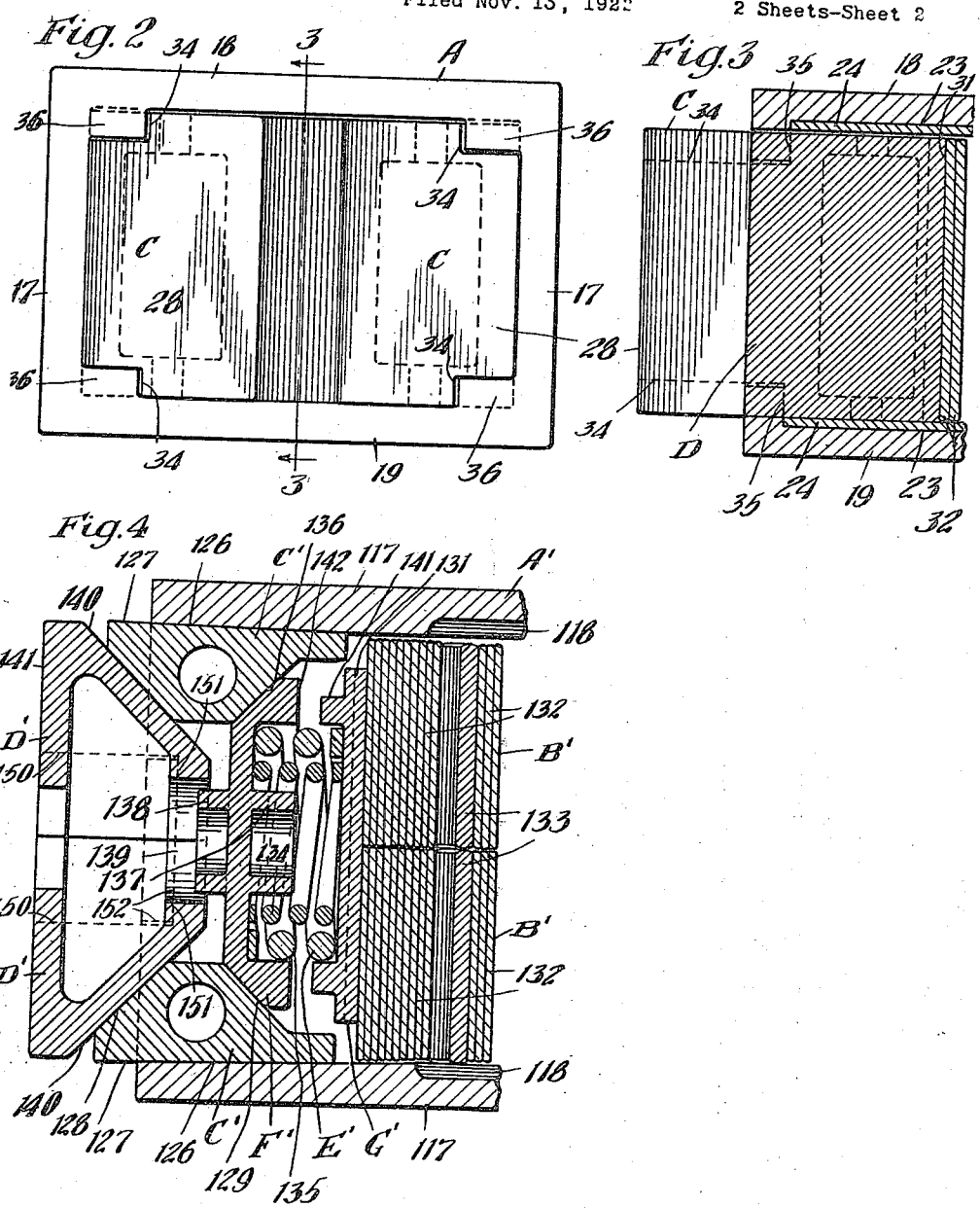

1,510,337

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 13, 1922. Serial No. 600,563.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of this invention is to provide, in a friction shock absorbing mechanism, especially adapted for railway draft riggings, a high capacity spring resistance.

A more specific object of this invention is to provide, in a shock absorbing mechanism, an improved spring resistance composed of a plurality of co-acting flat and curved spring plates, so arranged as to utilize the maximum space available for said spring resistance. Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Fig. 2 is an outer end view of the casing and wedge system associated therewith, looking from the left in Fig. 1. Fig. 3 is a vertical longitudinal sectional view taken substantially on the line 3—3 of Fig. 2. And Fig. 4 is a horizontal longitudinal sectional view similar to Fig. 1, illustrating a modified form of the invention.

In said drawings, 10—10 denote channel draft sills of a railway car underframe, the same having front stop lugs 11—11 and rear stop lugs 12—12 secured to the inner faces thereof. A portion of the draw bar is indicated at 13, the same being operatively associated with the shock absorbing mechanism proper by being suitably secured to a cast yoke 14. The shock absorbing mechanism proper, hereinafter described, is disposed within the yoke as is also the main front follower 15. The yoke and parts therewithin are supported in operative position by a detachable saddle plate 16.

The preferred form of my improved shock absorbing mechanism proper, as shown in Figs. 1, 2 and 3, comprises broadly, a follower acting casing A; a spring resistance B; a pair of wedge friction shoes C—C and a centrally disposed wedge element D.

The follower acting casing A is of rectangular form comprising side walls 17—17, top wall 18, bottom wall 19 and end wall 20. The side walls 17—17 have their inner faces longitudinally recessed as shown at 21 to receive longitudinally extending wear plates 22 and the upper and lower walls 18 and 19 are similarly recessed as shown at 23 to receive similar wear plates 24—24. The rear wall 20 of the casing A abuts the stop lugs 12 and has the inner face thereof curved transversely to form a concave seat 25 for the rear plate of the spring resistance hereinafter described. At the forward end of the casing, the side walls 17—17 are formed with slightly outwardly flaring longitudinal opposed friction faces 26.

The opposed wedge shoes C—C are provided with outer flat faces 27—27 co-acting with the inner friction faces 26—26 of the casing A and have their front ends 28 abutting the front follower 15. The wedge friction shoes C are also provided with inner wedge faces 29 co-acting with wedge faces 30 formed on the wedge member D.

The wedge member D is interposed between the wedge shoes C—C and the spring resistance B and has its rear face convexly curved transversely to the longitudinal axis of the gear, as indicated at 31.

The spring resistance B comprises a plurality of gangs of normally flat spring plates 32. Between each pair of gangs of plates and between the innermost gang and end wall of the casing are interposed transversely curved heavier spring plates 33. In the embodiment shown, there are six gangs of flat plates and corrspondingly, six heavy plates 33. Each gang of flat plates preferably comprises six separate plates. Each spacer plate 33 is preferbaly double the thickness of that of any single flat plate, for the purpose hereinafter described. The normal curvature of the spacer plates 33 is such that approximately $\frac{1}{16}$ inch space will be left between each end of said plate and the nearest points of the concave bearing surface 25 at the inner end of the casing A, it being understood that the curvature of all of said plates 33 is the same and also that the curvature of the bearing surface 31 of the wedge D is identical with the curvature of the rear bearing surface 25. Furthermore, the curvatures of the plates and bearing surfaces just referred to, will be so regulated that the total of the six spaces indicated at 70—70 normally existing between each curved plate and the nearest adjacent flat plate will equal or possibly slightly exceed the total travel of the mechanism.

In a compression stroke, the operation of the friction elements with respect to the shell will be obvious to those skilled in the art. As the wedge D moves inwardly of the casing, it is evident that the gangs of flat plates will be flexed on account of the curvature of the bearing surface 31. Due to the fact that each spacer curved plate 33 is double the thickness of each single flat plate, it is evident that the resilient capacity of each plate 33 will be eight times that of any single flat plate, the capacity in accordance with the formula for the moment of inertia varying directly as the cube of the thickness. The capacity of a gang of flat plates will merely be the sum of the capacities of the individual plates approximately, since the flat plates will obviously slip on each other. Hence, the capacity of one heavy curved plate 33 will exceed the total capacity of a gang of flat plates. Consequently, as the springs are pressed inwardly of the casing, the curved spacer plates will be flexed only slightly in actual practice approximately $\frac{1}{16}$ inch at each end, whereas each gang of plates will be flexed approximately $\frac{9}{16}$ and at the end of the full compression stroke, the innermost plate 33 will exactly conform with the bearing surface 25, all of the gangs of flat plates will be flexed to the same curvature, and the remainder of the heavy plates 33 will be similarly flexed. It is evident, therefore, that at the end of the compression stroke the entire space constitutes a solid mass of spring plates without any voids, or dead or inactive spaces whatsoever. Stated in another manner, by arranging the flat and curved plates as above described and adjusting their relative capacities as set forth, I am enabled to employ the entire space available for the springs, which, so far as I am aware, has never been accomplished in any prior device of the plate spring type.

In order to retain the parts of the shock absorbing mechanism in assembled relation, each of the wedge friction shoes C has its upper and lower outer corners recessed as indicated at 34 to thereby provide forwardly facing stop shoulders 35 which coact with rearwardly facing stop shoulders 36 formed at each corner of the casing A. In assembling, the shoes C, springs and wedge D, after they have been inserted within the casing A, will be subjected to a bull-dozer so that the shoes C may then readily be engaged behind the lugs 36.

The modified form of the invention shown in Fig. 4 comprises a shell or casing A'; a twin spring resistance B'—B'; a pair of wedge friction shoes C'—C'; centrally disposed pair of wedge elements D'—D'; an auxiliary spring resistance E'; and front and rear spring followers F' and G', respectively.

In the modified form shown in Fig. 4, the casing A' is in all respects similar to the casing A of the preferred embodiment with the exception that the side walls 117—117 are provided with ribs 118—118, instead of wear plates. The outer end of the casing A' has the inner faces of the side walls 117 formed with inwardly tapering longitudinally extending friction surfaces 126—126 co-acting with outer friction faces 127—127 on the wedge shoes C', in a manner similar to that of the preferred form. Each of the wedge friction shoes C' is provided with an outer wedge face 128 and an inner wedge face 129.

Within the casing A' are arranged two sets of spring plates each comprising a plurality of groups of flat spring plates 132 and curved spacing plates 133 similar as regards relative thickness and curvatures, to the corresponding flat and curved plates described in connection with the preferred form of the invention except that the spring plates are turned at right angles, that is, are curved in a vertical direction instead of horizontally as in Fig. 1.

The auxiliary spring resistance E' comprises inner relatively light coil spring 134 and an outer relatively heavy coil spring 135, said spring resistance having its inner end bearing on the spring follower G' and its outer end bearing on the spring follower F'.

The spring follower G' abuts the outermost plates of the end groups of flat plates and has its rear face curved convexly, as indicated at 131, similar to the curved face 31 on the wedge of the preferred form, and is provided with an outwardly projecting annular stop shoulder 141 co-acting with a similar annular projecting stop shoulder 142 on the inner face of the spring follower F' to prevent over-compression of spring E'.

The outer spring follower F' is provided with opposite wedge faces 136 co-acting with the wedge faces 129 of the friction wedge shoes C'. Said outer spring follower F' is also provided with an inwardly extending hollow centering boss 137 extending within the inner spring 134 and an outwardly extending centering boss 138 extending within an opening 139 formed by registering recesses in the inner ends of the wedge element D′—D′.

The wedge elements D′—D′ together form the outer wedge member, and each of said wedge elements D′ is provided with a wedge face 140 coacting with the wedge face 128 of the corresponding wedge friction shoe C′, and an outer flat face 141 coacting with the front follower of the draft gear.

In order to retain the parts of the shock absorbing mechanism shown in Fig. 4 in assembled relation the elements D′—D′ have the outer corners of their contacting faces recessed as shown at 150 to thereby provide forwardly facing stop shoulders 151 which coact with rearwardly facing stop shoulders 152 formed centrally of the side walls of the casing A′. In assembling, the shoes C′, springs B′—B′ and E′, and spring followers F′ and G′ after having been inserted in the casing A′, will be subjected to a bull dozer so that the wedge elements D′ may be readily engaged behind the shoulders 152.

In the operation of the modified form of the invention shown in Fig. 4, upon compression of the shock absorbing mechanism, the front follower will cause the wedge member D′ to move inwardly relatively to the casing A′, creating a wedge pressure on the shoes C′—C′, which are spring resisted by the auxiliary springs E′ and the main spring resistance B′—B′, thus creating frictional resistance to movement between the faces 126 and 127. In this connection it will be noted that the auxiliary spring E′ is compressed before the main spring resistance B′—B′, thus taking up all minor shocks without compression of the main spring resistance B′—B′. Compression of the auxiliary spring resistance E′ will continue until the stop shoulders 141 and 142 are brought into abutting relation, whereupon the pressure will be transmitted directly to the main spring resistance B′—B′.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism; the combination with pressure creating means; of a spring resistance co-acting therewith, said spring resistance comprising a plurality of spaced apart groups of flat spring plates and resilient spacing means between each of said groups, each spacing means being relatively thicker than the spring plates.

2. In a friction shock absorbing mechanism, the combination with a pressure creating means; of a spring resistance coacting therewith, said spring resistance comprising a plurality of flat spring plates and a plurality of laterally curved spacing plates, said flat and curved plates being of different thickness.

3. In a friction shock absorbing mechanism; the combination with a pressure creating means; of a spring resistance co-acting therewith, said spring resistance comprising a plurality of flat spring plates and a plurality of relatively thicker resilient curved spacing plates.

4. In a friction shock absorbing mechanism; the combination with a casing, having side walls provided with interior friction surfaces and an end wall provided with a concave inner surface; of friction wedge-shoes co-acting with said friction surfaces; a follower engaging said shoes; a wedge co-acting with said shoes, said wedge having a convex rear surface; a plurality of groups of spaced apart flat spring plates within said casing, interposed between the rear wall thereof and said wedge; and curved spacing plates interposed between said groups of plates.

5. In a friction shock absorbing mechanism, the combination with a casing, having its outer end provided with interior friction surfaces and its inner end closed by an end wall, said end wall being provided with a concave inner surface; of a wedge system comprising a plurality of inner wedge shoes having faces co-acting with said interior friction surfaces and a wedge co-acting with said wedge shoes, said wedge having a convex rear surface; a follower engaging said shoes; a spring resistance within said casing interposed between the end wall thereof and said wedge system, said spring resistance comprising a plurality of groups of spaced apart flat spring plates and a plurality of curved spacing plates, said convex face of said wedge engaging the outermost plate of one of said groups of flat plates, and said concave inner surface of said end wall engaging with one of said curved plates.

6. In a shock absorbing mechanism, the combination with two members adapted to move relatively toward and from each other and having opposed correspondingly curved convex and concave surfaces respectively; of a gang of normally flat spring plates between said members and in engagement with the concave surface of the one; and a spring plate having a capacity in excess of the total of the gang of the flat plates, located between the gang of flat plates and the concave bearing surface of the other members, said last named heavier plate being curved upon a slightly shorter radius than the curvature of said convex and concave surfaces.

7. In a shock absorbing mechanism, the combination with a member having a concave bearing surface; of a second member movable relatively toward and from the first member and having an opposed convex surface; and a plurality of alternated gangs of flat spring plates and curved spacer spring plates between said convex and concave bearing surfaces, a gang of flat plates being in engagement with the convex surface, the capacity of a curved spacer plate being in excess of that of a gang of flat plates, the degree of curvature of the spacer plates being in excess of the degree of the curvature of the concave bearing surface.

8. A spring comprising a plurality of flat spring plates and a plurality of laterally curved resilient spacing plates, said flat and curved plates being of different thickness.

9. A spring comprising a series of groups of flat spring plates and a plurality of relatively thicker resilient curved spacing plates separating said groups.

In witness that I claim the foregoing I have hereunto subscribed my name this 14th day of October 1922.

JOHN F. O'CONNOR.

Witnesses:
 Una C. Grigsby,
 H. M. Deamer.